(12) United States Patent
Howe

(10) Patent No.: US 7,004,431 B1
(45) Date of Patent: Feb. 28, 2006

(54) HIGH PRESSURE SPRAY SYSTEM

(75) Inventor: Richard Howe, Punta Gorda, FL (US)

(73) Assignee: Aeromister, LLC, Punta Gorda, FL (US)

( * ) Notice: Subject to any disclaimer, the term of this patent is extended or adjusted under 35 U.S.C. 154(b) by 71 days.

(21) Appl. No.: 10/847,945

(22) Filed: May 18, 2004

Related U.S. Application Data

(63) Continuation-in-part of application No. 10/687,613, filed on Oct. 20, 2003, now Pat. No. 6,886,784.

(51) Int. Cl.
  *B64D 1/18* (2006.01)
(52) U.S. Cl. ...................................... 244/136; 239/171
(58) Field of Classification Search ................ 244/136, 244/1 R; 239/171, 159, 163
  See application file for complete search history.

(56) References Cited

U.S. PATENT DOCUMENTS

| | | | | |
|---|---|---|---|---|
| 2,537,251 A | * | 1/1951 | Wilson | 244/136 |
| 2,665,092 A | * | 1/1954 | Sands | 244/136 |
| 3,463,424 A | * | 8/1969 | Pickell | 244/131 |
| 2001/0019090 A1 | * | 9/2001 | Horev | 244/136 |

* cited by examiner

Primary Examiner—Peter M. Poon
Assistant Examiner—T D. Collins
(74) Attorney, Agent, or Firm—Dennis G. LaPointe

(57) ABSTRACT

An aircraft attached apparatus/method for spraying pesticides having two propeller shafts attached to the aircraft. Each shaft has a full feathering propeller mounted at the forward ends of the propeller shaft and a control cable extending to the cockpit. High pressure pumps, typically piston pumps, are mounted on the aft ends of each of the propeller shafts. The input side of the pumps are connected to a tank, and the output side is connected to respective matrix spray boom assemblies. The forward ends of each of the spray boom assemblies are connected to the output side of each respective pump. Spray nozzles, typically impingement nozzles, are attached to each of the aft ends of each spray boom. The high pressure pumps have an electrically operated magnetic brake attached thereto, and each of the spray boom assemblies have a pressure transmitter connected to a digital display in said aircraft.

7 Claims, 7 Drawing Sheets

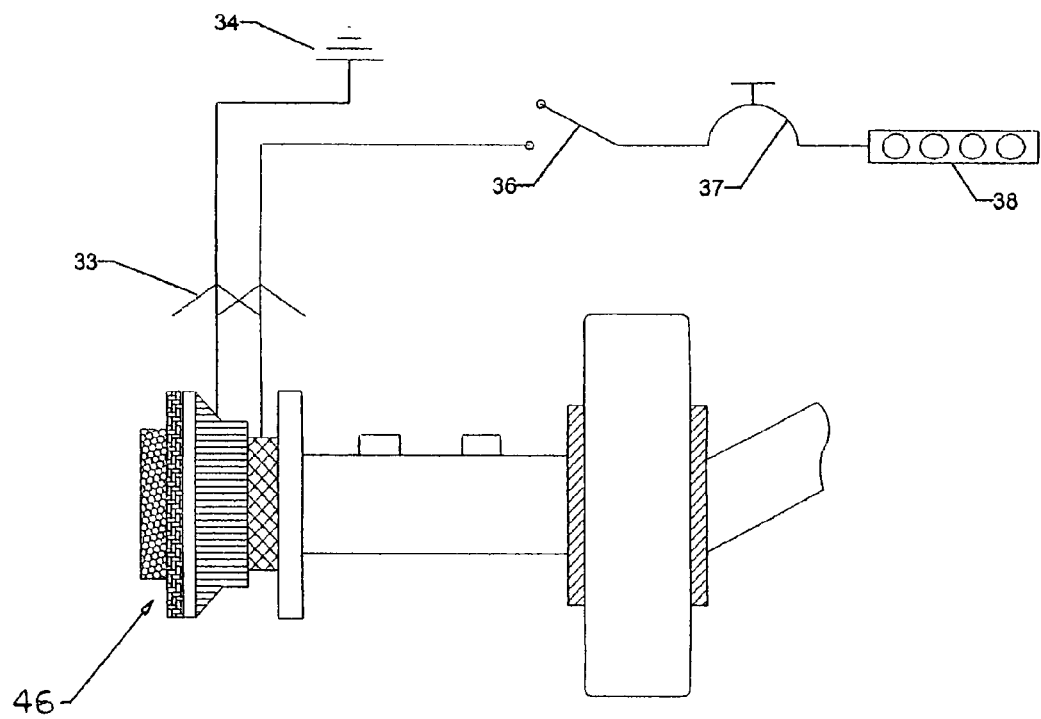
Fig. 5
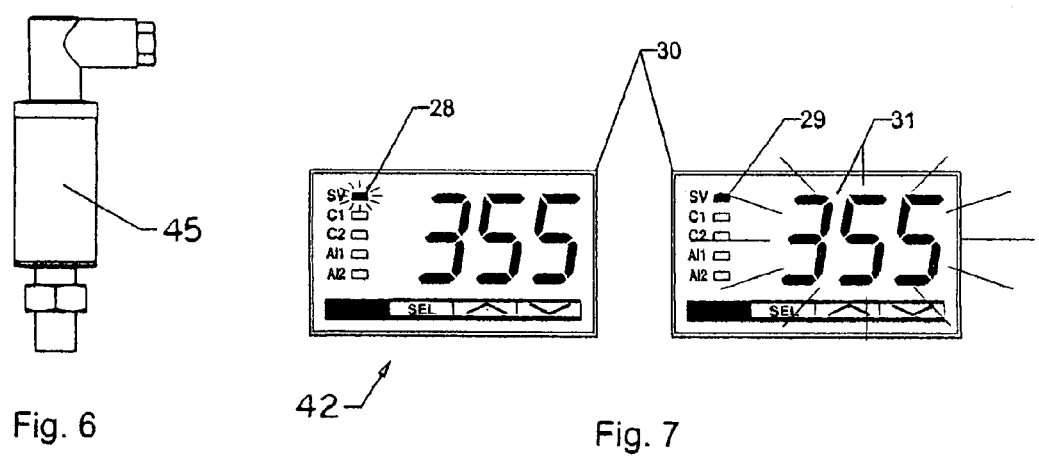
Fig. 6
Fig. 7

Average Process Control Variables
Valid Data Record
Material : 8005 dibrom      Lot : 50psi 140 mph

Standard Values:
Transmission = 71.76%      Dv(10) = 24.91 (μm)      Span = 1.67
Cv = 366.6 (PPM)           Dv(50) = 85.06 (μm)      D[3][2] = 40.86 (μm)
SSA = 0.147 (m^2/cc)       Dv(90) = 167.35 (μm)     D[4][3] = 93.55 (μm)

| Title | Average | Standard Deviation | Max | Min |
|---|---|---|---|---|
| Dv(10.0) (μm) | 30.96 | 16.32 | 102.71 | 6.71 |
| Dv(50.0) (μm) | 81.77 | 19.96 | 140.90 | 41.54 |
| Dv(90.0) (μm) | 167.19 | 10.68 | 196.43 | 141.22 |
| % Volume < 30.0 | 13.20 | 10.60 | 39.42 | 0.02 |
| % Volume < 50.0 | 27.75 | 14.24 | 56.07 | 0.59 |
| 7.0 < % Volume < 22.0 : Avg | 5.06 | 3.07 | 8.19 | 0.01 |

FIG. 11

Average Process Control Variables
Valid Data Record
Material : pj12 dibrom     Lot : 6000 psi 140 mph

Standard Values:
Transmission = 33.25%    Dv(10) = 2.33 (μm)    Span = 1.95
Cv = 154.0 (PPM)         Dv(50) = 10.75 (μm)   D[3][2] = 5.44 (μm)
SSA = 1.104 (m^2/cc)     Dv(90) = 23.25 (μm)   D[4][3] = 12.25 (μm)

| Title | Average | Standard Deviation | Max | Min |
|---|---|---|---|---|
| Dv(10.0) (μm) | 4.07 | 3.97 | 18.22 | 1.53 |
| Dv(50.0) (μm) | 10.50 | 4.20 | 23.36 | 6.47 |
| Dv(90.0) (μm) | 22.21 | 2.59 | 47.66 | 17.41 |
| % Volume < 30.0 | 96.18 | 2.11 | 98.98 | 81.01 |
| % Volume < 50.0 | 99.35 | 0.79 | 100.00 | 90.21 |
| 7.0 < % Volume < 22.0 : Avg | 57.40 | 7.04 | 71.73 | 46.80 |

FIG. 12

HIGH PRESSURE SPRAY SYSTEM

RELATED INVENTION

This is a Continuation-In-Part of U.S. patent application Ser. No. 10/687,613, filed Oct. 20, 2003 now U.S. Pat. No. 6,886,784.

FIELD OF THE INVENTION

The present invention relates to spraying apparatus and more particularly to spraying apparatus and a method for spraying suspensions or solutions from any aircraft wherein the suspensions or solutions has predetermined characteristics independent of the speed of the aircraft carrying out the spraying.

DESCRIPTION OF THE PRIOR ART

Mosquito-borne diseases affect millions of people worldwide each year. In the United States, some species of mosquitoes can transmit diseases such as enciphalitis, dengue fever, and malaria to humans, and a variety of diseases to wildlife and domestic animals. To combat mosquitoes and the public health hazards they present, many states and localities have established mosquito control programs. These programs, which are based on surveillance, can include nonchemical forms of prevention and control as well as ground and aerial application of chemical and biological pesticides.

The first step in mosquito control is surveillance. Mosquito specialists conduct surveillance for diseases harbored by domestic and non-native birds, including sentinel chickens (used as virus transmission indicators), and mosquitoes. Surveillance for larval habitats is conducted by using maps and aerial photographs and by evaluating larval populations. Other techniques include various light traps, biting counts, and analysis of reports from the public. Mosquito control programs also put high priority on trying to prevent a large population of adult mosquitoes from developing so that additional controls may not be necessary. Since mosquitoes must have water to breed, methods of prevention may include controlling water levels in lakes, marshes, ditches, or other mosquito breeding sites, eliminating small breeding sites if possible, and stocking bodies of water with fish species that feed on larvae. Both chemical and biological measures may be employed to kill immature mosquitoes during larval stages. Larvicides target larvae in the breeding habitat before they can mature into adult mosquitoes and disperse. Larvicides include the bacterial insecticides *Bacillus thuringiensis* israelensis and *Bacillus sphaericus*, the insect growth inhibitor methoprene, and the organophosphate insecticide temephos. Mineral oils and other materials form a thin film on the surface of the water which cause larvae and pupae to drown. Liquid larvicide products are applied directly to water using backpack sprayers and truck or aircraft-mounted sprayers. Tablet, granular, and briquet formulations of larvicides are also applied by mosquito controllers to breeding areas.

Adult mosquito control may be undertaken to combat an outbreak of mosquito-borne disease or a very heavy nuisance infestation of mosquitoes in a community. Pesticides registered for this use are adulticides and are applied either by aircraft or on the ground employing truck-mounted sprayers. State and local agencies commonly use the organophosphate insecticides malathion and naled and the synthetic pyrethroid insecticides permethrin, and sumithrin for adult mosquito control.

Mosquito adulticides are applied as ultra-low volume (ULV) spray. ULV sprayers dispense very fine aerosol droplets that stay aloft and kill flying mosquitoes on contact. ULV applications involve small quantities of pesticide active ingredient in relation to the size of the area treated, typically less than 3 ounces per acre, which minimizes exposure and risks to people and the environment. Some communities have thermal foggers that use an oil carrier that is heated to disperse the pesticide in a dense smoke-like fog.

The best time to kill adult mosquitoes by fogging is at dusk, when they are most active and looking for food (mosquitoes feed on human or animal blood). The aerosol fog primarily targets flying mosquitoes, which is why the timing of the spray is critical.

The most commonly used products are synthetic pyrethroid insecticides (such as Scourge and Anvil), pyrethrins and malathion. All insecticides used for mosquito control must be registered with the U.S. Environmental Protection Agency (EPA). During the fogging, flying mosquitoes within the treated area are killed. Although the local mosquito population is reduced for a few days, fogging does not prevent mosquitoes from re-entering the area.

Currently, ultra-low volume (ULV) applications of adulticides represent one of the most widely used and effective methods for control of mosquitoes in urban and suburban areas. Experiments to determine the relationship between insecticidal droplet size and kill of adult mosquitoes were conducted using laboratory wind tunnel tests with monodisperse aerosols and field tests with ground ULV aerosol generators. Previous research has shown that the effectiveness of these applications is fundamentally related to the particle or droplet size of the aerosol. This is particularly true for applications which depend on direct contact of the insecticide with the insect body.

Latta et al. (1947) conducted a laboratory wind tunnel study with uniform droplet sizes of DDT which indicated that 12 to 20 $\mu$m diameter was optimum for adult mosquito control with wind velocities of 2 to 8 mph. La Mer et al. (1947) indicated that the optimum droplet size for mosquito control was 15.8 $\mu$m in a theoretical analysis. Mount et al. (1968) reported that malathion aerosols with 6 to 10 $\mu$m volume median diameter (VMD) were more effective with 11 to 22 $\mu$m VMD when applied with truck-mounted equipment in field tests with caged mosquitoes.

SUMMARY OF THE INVENTION

The present invention provides a Hi-Pressure Spray System. The system is designed to dispense mosquito control pesticide. In a first embodiment, the power section consists of a mounting frame to be attached to an aircraft. Its primary advantage is universal adaptability to anything that flies and the ability to achieve a tenfold increase in product efficiency. Attached to the frame are two propeller shaft bearings. A propeller shaft is mounted between the shaft bearings. A full "feathering" propeller is mounted on the forward end of the propeller shaft. A piston type high pressure pump is mounted on the aft end of the propeller shaft. A feathering control is attached to the propeller hub and connected to a control in the cockpit of the aircraft. A pesticide supply line is connected to the input of the piston type pump. A spray boom, mounted on the frame, is connected to the output of the pump. The spray boom has a plurality of impingement nozzles mounted therein.

In a second embodiment of the invention, a "matrix-type" boom is used. In addition, a second wind operated aerosol generator is mounted on the aircraft. The matrix type boom may be attached to the underside of the wing, and the matrix sprayers are at a 90° angle (vertical) to the wing surface. The matrix sprayers are located on the wing, in a position beyond the outer tip of the horizontal elevator of the aircraft tail. The impingement nozzles are mounted on equal length extensions from the pesticide supply line to provide an identical pressure at each of the impingement nozzles.

BRIEF DESCRIPTION OF THE DRAWINGS

The invention will now be described by way of example with reference to the accompanying drawings in which:

FIG. 5 is a schematic for an electric pump brake for the spray system.

FIG. 6 is a side view of a pressure transmitter attached to a boom.

FIG. 7 is a front view of a digital display of boom pressure installed in the cockpit.

FIG. 11 is a chart showing the average process control variables at 50 psi.

FIG. 12 is a chart showing the average process control variables at 6000 psi.

BEST MODE OF CARRYING OUT THE INVENTION

Figure 1:
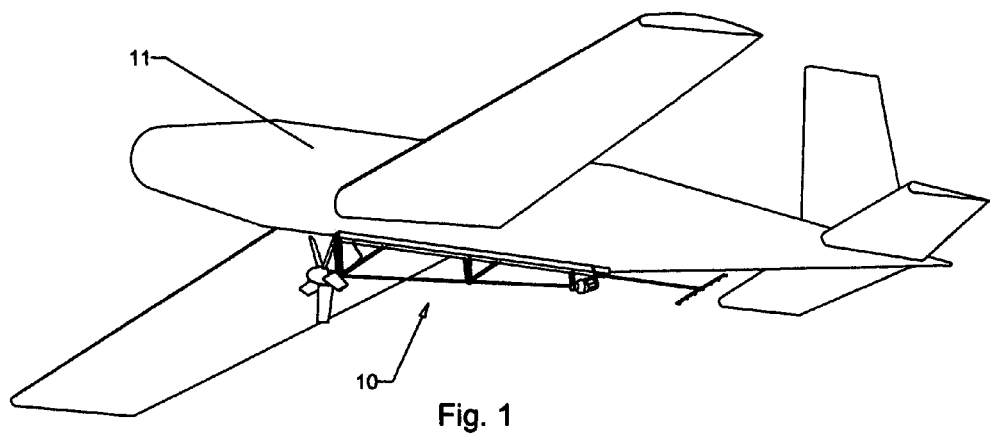
FIG. 1 is a bottom perspective view of the invention attached to the underside of an aircraft.
Figure 2:
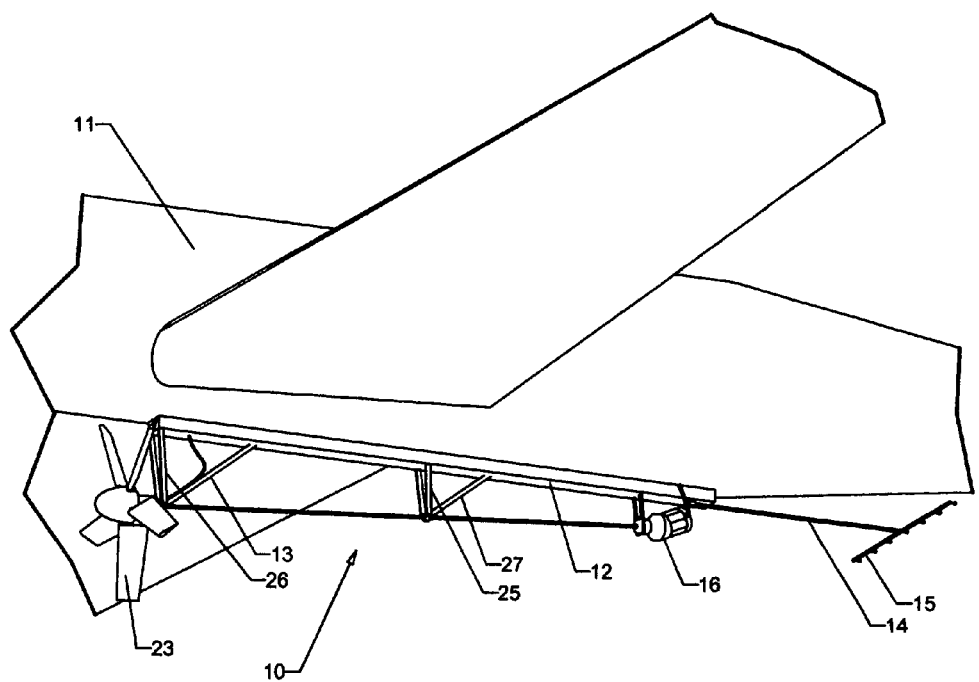
FIG. 2 is a close-up bottom perspective view of the invention attached to the underside of an aircraft.
Figure 3:
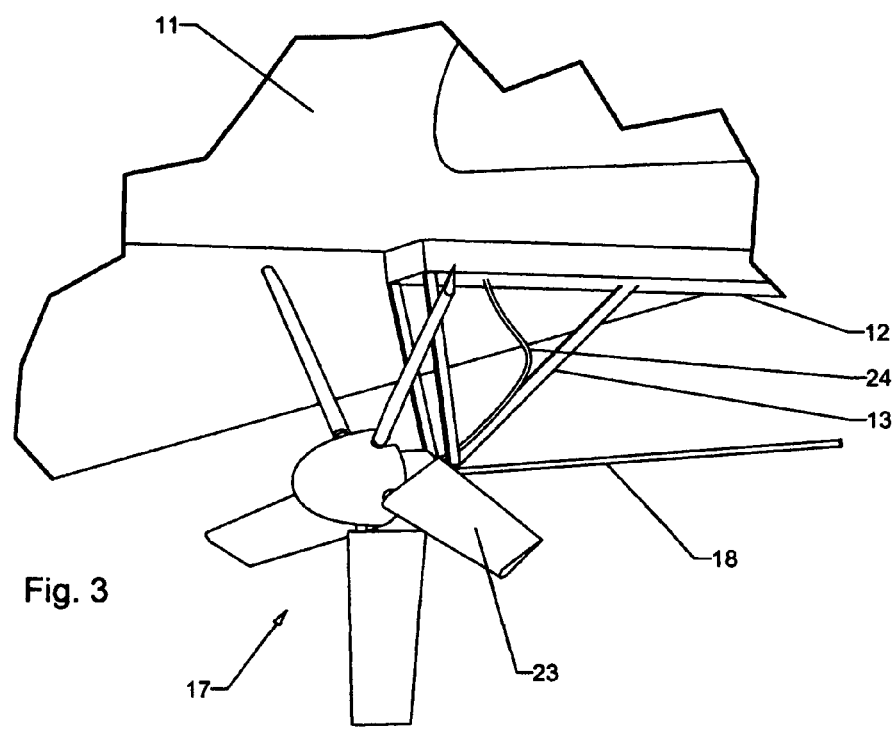
FIG. 3 is a close-up bottom perspective view of the feathering prop mounting.
Figure 4:
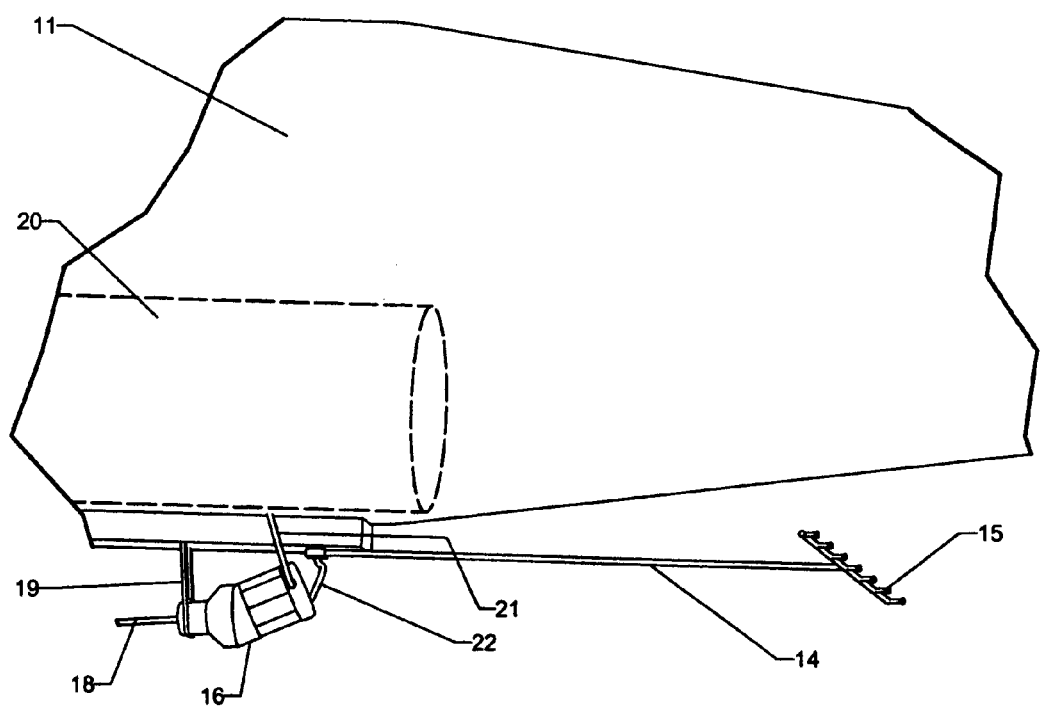
FIG. 4 is a close-up bottom perspective view of the pump and spray boom attached to the bottom of an aircraft.

As shown in the accompanying figures, FIGS. 1–4 disclose a first embodiment of a high pressure spray system 10 attached to the underside of an aircraft 11. A base mounting frame 12 is attached to the underside of the fuselage or to the underside of a wing of the aircraft 11. Attached to the frame 12, are two bearing braces 25 and 26. Bearing brace 25 is reinforced with bracket 13 and bearing brace 26 is reinforced with bracket 27. Propeller shaft 18 is mounted through the bearing braces 25, and 26. A full feathering propeller 23 is mounted on the forward end of shaft 18. Feathering is controlled from within the aircraft by the pilot (controls not shown) through cable 24. The propeller 23 will generally revolve at 4,000 RPM.

The aft end of the shaft 18 is attached to rotary piston type high pressure pump 16, supported by bearing brace 19. The pistons, or plungers (not shown), of the pump 16, repeat reciprocation with rotation of the driving shaft 18. The high pressure pump 16 can deliver insecticide pressures to the optimum pressure of 6,000 psi. Insecticides are pumped from the tank 20, located in the interior of the aircraft 11, through the hose 21. The high pressure insecticide is fed through the outlet of the pump 16 to the spray boom 14 with nozzles 15 mounted on the outside surface.

Nozzles 15 (nozzles 41—second embodiment) consist of impingement elements with the insecticide droplets (10 microns of each drop) being created by the force of the high pressure insecticide hitting the pointed, impingement surface. The resulting spray with the high pressure impingement nozzles 15, with the aircraft flying at 150 MPH, at 300 feet, will create a fog, two miles wide, which lasts for as long as 5 hours. Approximate volume of insecticides used is 2 gallons per minute. In a preferred embodiment, a BETE PJ-12 "impingement" nozzle was used.

Figure 9:
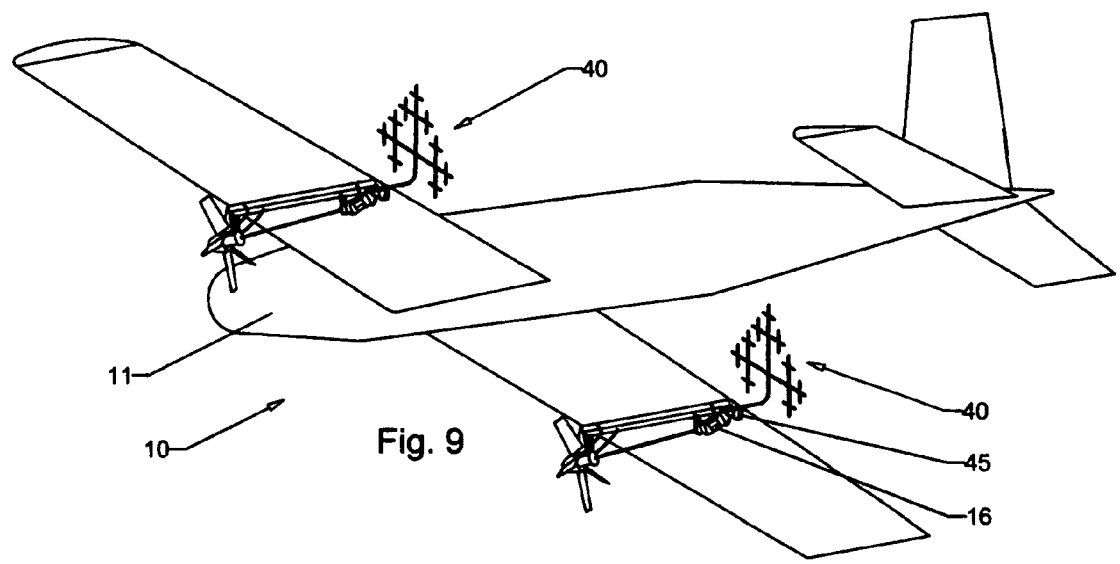
FIG. 9 is a bottom perspective view of two matrix booms attached to the wing bottom of an airplane.
Figure 10:
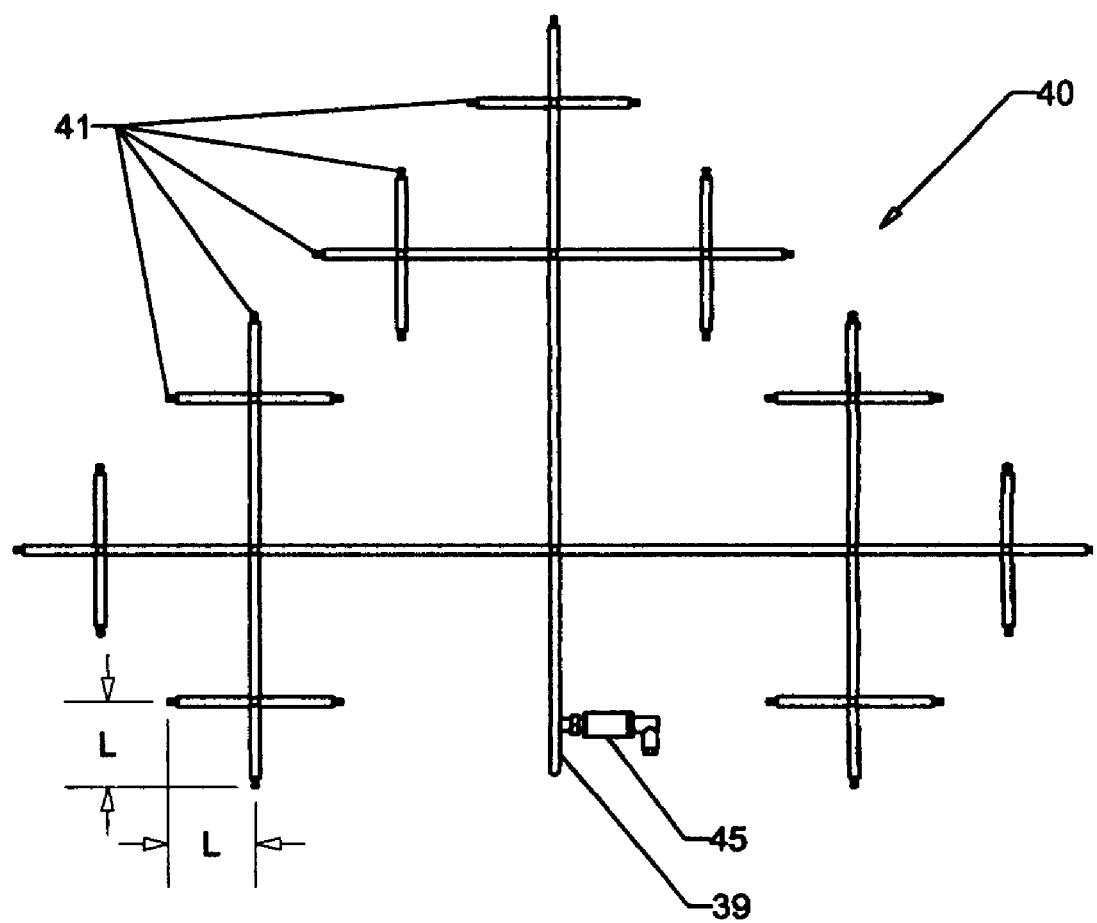

FIGS. 5–10 show a second embodiment of the invention. The high pressure spray system 10 is basically the same assembly of the first embodiment. The major advancement is the use of a matrix or "tree" type boom assembly 40. The advantage of the matrix boom assembly 40 will be to eliminate line loss. For example, if a boom has 5 nozzles that run down a straight boom, every nozzle that the fluid has to pass will drop the line pressure somewhat so that when the fluid gets to the last nozzle, the pressure could be considerably reduced. The matrix type boom assembly 40 of the invention will feed all of the nozzles 41 an equal amount of pressure because the fluid will go directly to the end nozzle 41 without having to go by any other nozzle 41 thereby losing some of the original boom pressure that is at the source of the boom assembly 40 feed line 39. As shown in FIG. 10, the letter "L" denotes the common length of each of the nozzles 41. The basic difference with the second embodiment is the position of boom assembly 40 which is in a vertical position to the wing. The two boom assemblies 40 are located on the underside of the wings, in a position beyond the outer tip of the horizontal elevator of the aircraft tail. The matrix boom assembly 40 are attached at a 90° angle (vertical) to the wing surface. In a vertical position, the matrix sprayer nozzles 41 dispense the pesticides without interference of adjacent nozzles 41 and do not accumulate on the tail surfaces of the aircraft.

For pressure indications, a pressure transmitter 45 may be mounted on the spray boom 39. The pressure transmitter 45 is connected to a digital display 42 in the cockpit. LED display 28 shows the process value when flickering. Numeral 30 is used to indicate the different values by switching from standby to automatic operation. LED display 31 shows the set value and LED display 29 is lit when the set value is shown. For pressure indications, digital display 42 connected to the pressure transmitter 45 (transducer) directly from the boom 39 to the indicator, digital display 42 via two wires (not shown). The pressure transmitter 45 is powered using DC current that operates in the 13/30 volt range. The advantage of electric transducers over direct reading gauges is the ability to keep all of the hi-pressure spray fluid confined to the spray boom 39 and not let any of the spray into the airplane for the sake of safety.

Another addition to the second embodiment includes an electrically operated magnetic brake 46, attached to the pump 16, to operate as an "on-off" switch for the spray system 10. The brake 46 is connected by 14 GA. wire with one end connected to ground 34, and the switch 36, which is located in the vicinity of the spray handle (not shown) in the cockpit. A circuit breaker 37 is connected between the switch 36 and the buss bar 38.

Method of Operation

Figure 8:
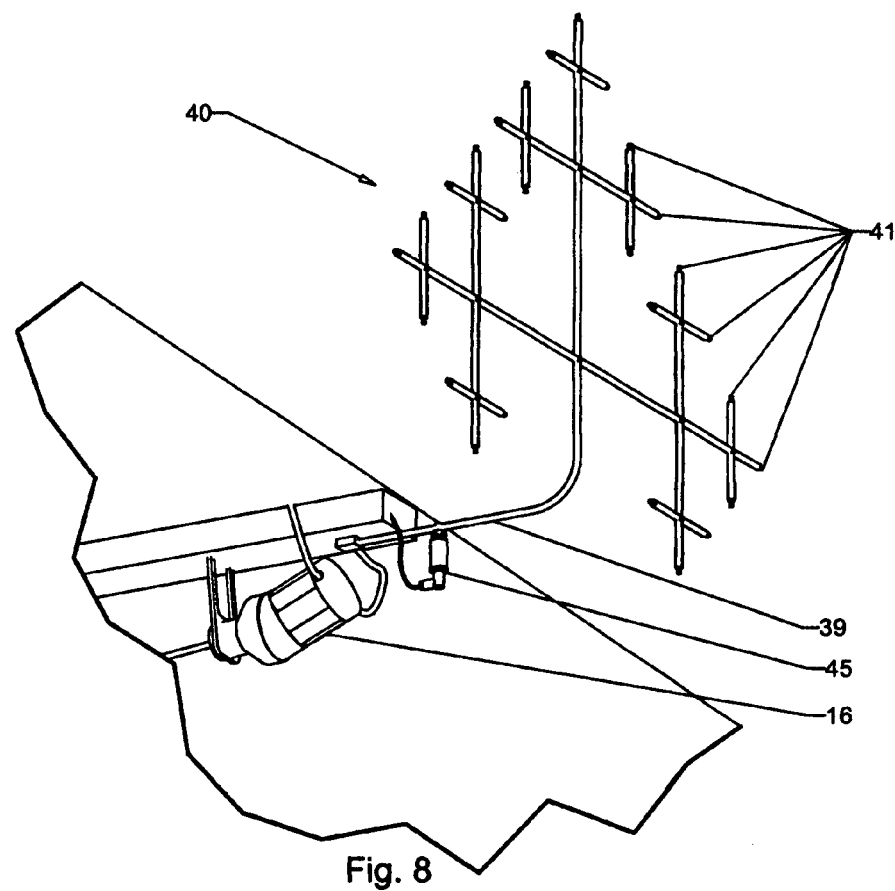
FIG. 8 is a bottom perspective view of the matrix boom attached to the wing bottom of an airplane.

A most effective method of displacement of mosquito control insecticides is through the use of dual pesticide pumps as shown in FIGS. 8–10. A first pump will deliver one gallon per minute and the other will deliver two gallons per minute. Starting on the upwind side of the target, both systems will be operated, thereby delivering a total of 3 GPM. The second pass, downwind, will run only the 2 GPM pump. The reason for using only the 2 GPM pump is due to the carry-over from the first spray pass. In effect, the second pass only reinforces the initial pass, thus there is no need for a full dose of pesticide. The third pass will run only with the 1 GPM pump as the aircraft will be nearing the end of the spray target. The objective is not to spray beyond the boundary limits any more than necessary. This technique will optimize the efficiency of product dispensed for both economic and environmental benefits. It is estimated that a target some 10 miles wide could be treated with only three passes at 3 mile intervals, with a 2 mile offset to the upwind boundary and a 4 mile offset to the downwind boundary. Total product will be about 50% of pesticide over the conventional, non variable, spray system flow technique.

Test Results

FIGS. 11 and 12 show a comparison of the average process control variables between 50 psi to 6,000 psi. Applicant has dedicated a considerable amount of time, in an effort to improve the existing Hi-Pressure spray system technology and have as a consequence, managed to develop the most efficient spray system in use today. Using a wind tunnel, equipped with a Malvern laser measuring device, a series of tests using an actual product, Dibrom #14 were conducted.

Below is a synopsis of seven tests that were run and high light pertinent aspects of these tests.
  a. Spraying Systems 8005 flat fan nozzle at 50 psi came in at 5.1% efficient with 27.8% of the total volume under 50 microns.
  b. Spraying Systems M-1 nozzle at 3,000 psi was 24.9% efficient with 89.7% of the total volume under 50 microns.
  c. Spraying Systems M-1 nozzle at 6,000 psi was 38.6% efficient with 97.2% of the total volume under 50 microns.
  d. BETE PJ-12 nozzle at 3,000 psi was 44.2% efficient with 98% of the total volume under 50 microns.
  e. BETE PJ-12 nozzle at 6,000 psi was 57.4% efficient with 99.3% of the total volume under 50 microns.
  f. BETE PJ-10 nozzle at 7,500 psi was 57.6% efficient with 99.9% of the total volume under 50 microns.

Note 1: The "efficiency" rating was established on the basis of a study conducted by Dr. Gary Mount some 30 years ago.

Note 2: A new standard proposed by the EPA will allow no more than 5% of spray volume to go above 50 microns. Consequently, a separate breakdown has been provided for the wind tunnel print out listing this number.

Note 3: Applicant's experience basis has been 21 million acres with the flat fan 8005 nozzle, 2 million acres using the Hi-Pressure system with the M-1 nozzle at 3,000 psi with a 50% reduction, 1 million acres at 6,000 psi using the M-1 nozzle with a 75% product reduction.

It has therefore been shown that Applicant's high pressure spray achieves the optimum efficiency of pesticides. The ability to vary the pitch of the feathering propeller while changing the direction or speed of the aircraft, provides a constant, effective spray. The instant invention provides a widespread insecticide fog which sticks to the wings of insects and increases the mortality rate. Reducing the amount of pesticide used thereby reducing the mortality rate of fiddler crabs and other species.

Although the invention has been described by way of example and with reference to possible embodiments it is to be appreciated that improvements and/or modifications may be made to these embodiments without departing from the scope of the invention.

What is claimed is:

1. An apparatus for spraying suspensions/solutions from an aircraft and having predetermined characteristics independent of the speed of the aircraft carrying out the spraying, said apparatus comprising:
   a first and second propeller shaft, each of said first and second propeller shafts having a forward end and an aft end,
   means for attaching said propeller shafts to an aircraft,
   a full feathering propeller being mounted on each of said forward ends of said propeller shafts, each of said propellers having a control cable attached thereto, said cables extending to a cockpit of said aircraft and being adapted to be controlled by an operator in said aircraft,
   a first and second high pressure pump being mounted on said aft ends of each of said propeller shafts, the input side of said pumps being connected to a tank mounted on the interior of said aircraft,
   a first and second matrix spray boom assembly, each of said first and second matrix spray boom assemblies being in fluid communication with a respective output side of said first and second high pressure pumps, each of said first and second matrix spray boom assemblies further being directed in a generally vertical orientation to form a matrix array of a plurality of spray nozzles wherein each branch of each matrix array of spray nozzles is configured so that suspensions or solutions to be sprayed flow to each nozzle at equal pressure.

2. The apparatus according to claim 1, each of said high pressure pumps having an electrically operated magnetic brake attached thereto, and each of said first and second matrix spray boom assemblies having a pressure transmitter attached thereto, each of said pressure transmitters being connected to a digital display in said aircraft.

3. The apparatus according to claim 1 wherein said spray nozzles comprise high pressure impingement nozzles.

4. The apparatus according to claim 1, wherein said first and second high pressure pumps are rotary piston pumps.

5. An apparatus for spraying suspensions/solutions from an aircraft and having predetermined characteristics independent of the speed of the aircraft carrying out the spraying, said apparatus comprising:
   a first and second propeller shaft, each of said first and second propeller shafts having a forward end and an aft end,
   means for attaching said propeller shafts to an aircraft,
   a full feathering propeller being mounted on each of said forward ends of said propeller shafts, each of said propellers having a control cable attached thereto, said cables extending to a cockpit of said aircraft and being adapted to be controlled by an operator in said aircraft,
   a first and second high pressure pump being mounted on said aft ends of each of said propeller shafts, the input side of said pumps being connected to a tank mounted on the interior of said aircraft,
   a first and second matrix spray boom assembly, each of said first and second matrix spray boom assemblies being in fluid communication with a respective output side of said first and second high pressure pumps, each of said first and second matrix spray boom assemblies further being directed in a generally vertical orientation to form a matrix array of a plurality of spray nozzles wherein each branch of each matrix array of spray nozzles is configured so that suspensions or solutions to be sprayed flow to each nozzle at equal pressures, and each of said high pressure pumps having an electrically operated magnetic brake attached thereto, and each of said first and second matrix spray boom assemblies having a pressure transmitter attached thereto, each of said pressure transmitters being connected to a digital display in said aircraft.

6. The apparatus according to claim 5 wherein said spray nozzles comprise high pressure impingement nozzles.

7. The apparatus according to claim 5, wherein said first and second high pressure pumps are rotary piston pumps.

* * * * *